UNITED STATES PATENT OFFICE.

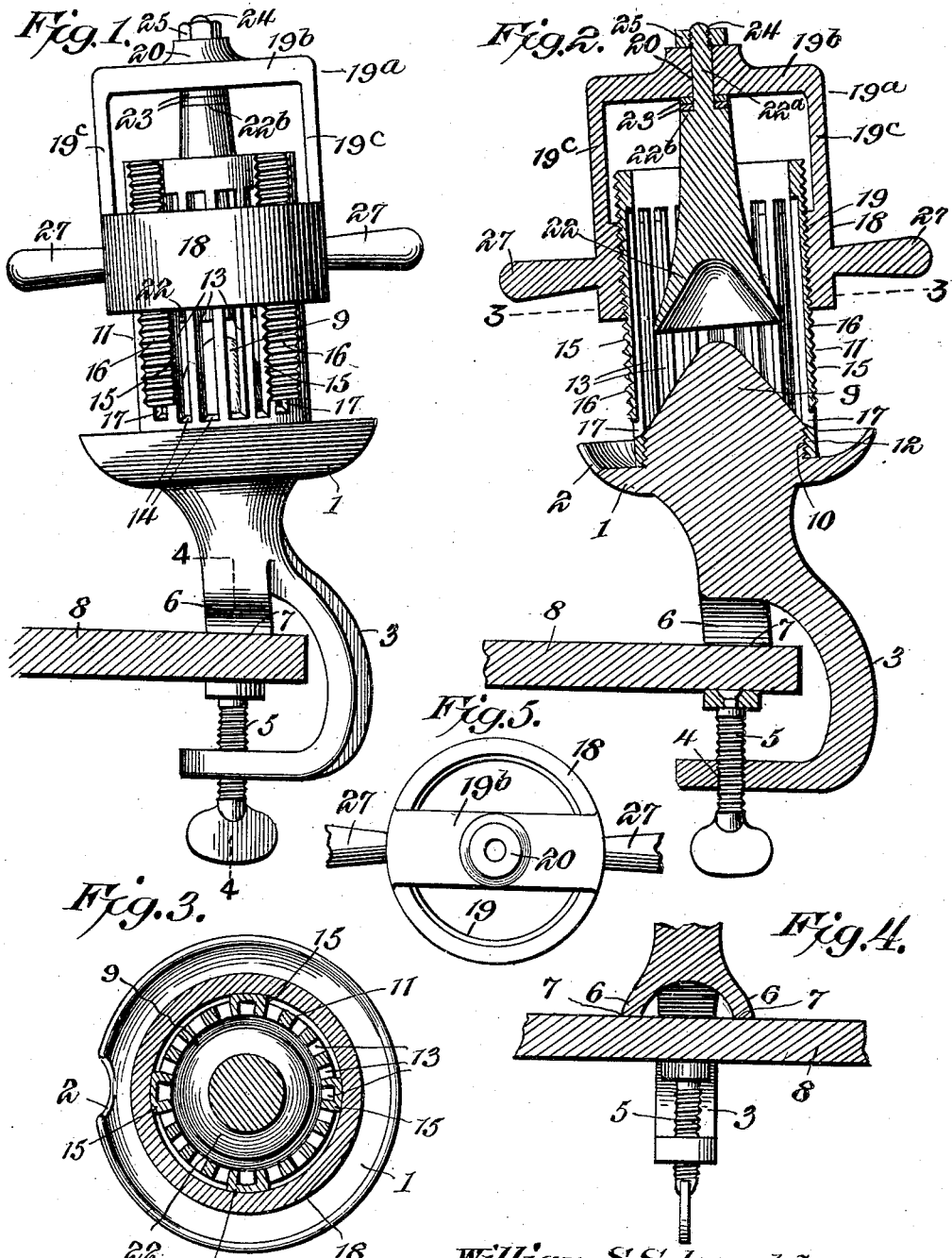

WILLIAM S. SCHWARTZ, OF AMITY, OREGON.

LEMON-SQUEEZER.

No. 898,690.  Specification of Letters Patent.  Patented Sept. 15, 1908.

Application filed February 15, 1908. Serial No. 416,139.

*To all whom it may concern:*

Be it known that I, WILLIAM S. SCHWARTZ, a citizen of the United States, residing at Amity, in the county of Yamhill and State of Oregon have invented a new and useful Lemon-Squeezer, of which the following is a specification.

This invention relates to presses, and has for one of its objects to provide a device of this character for expressing the juices from various fruits, and particularly lemons, and in this connection it should be stated that the invention is specially designed to serve as a "lemon squeezer."

A further object of this invention is to provide a portable press which is adapted to express the juice from a number of lemons in one operation, and catch and deliver the juice to a receptacle.

A still further object of this invention is to provide a press of simple construction, easy of operation and cheap to manufacture.

In the drawing:—Figure 1 is a side elevation of the invention, showing the press clamped to a support. Fig. 2 is a vertical sectional view of Fig. 1. Fig. 3 is a horizontal sectional view taken on the line 3—3 of Fig. 2, and Fig. 4 is a detail view of the clamping member taken on the line 4—4 of Fig. 1. Fig. 5 is a top plan view of the juice expressing means.

Referring to the drawing, 1 designates a circular bowl which is provided with an outlet opening or spout 2 at its lower side. Integral with the bowl is a clamp comprising a yoke 3 having a threaded opening 4 in the horizontal lower portion thereof, said opening being adapted to receive the clamping screw 5, and downwardly extending diverging legs 6—6 which are outwardly inclined and spaced apart, thereby forming a fork which straddles the vertical plane of the clamp. It will be observed that the undersides 7—7 of the legs 6—6 are upwardly inclined from the inner edge outwardly, a feature which causes the bowl to assume an inclined position with relation to the table or other support 8 when the device is clamped thereto by the thumb-screw 5. The horizontal lower portion of the yoke is parallel with the lower face or underside of the legs, so that the screw may engage the underside of the table properly when the parts are applied. Extending above the bowl 1 and integral therewith is a cone 9 which is arranged within the center of said bowl. The cone is provided with a vertical wall at its base, which wall is formed with a series of threads 10.

A cylinder 11, which is formed with a series of internal threads 12 at its base, is screwed onto the cone 9 engaging the threads 10. Said cylinder is provided with a series of spaced vertical slots 13 that terminate short of both the top and bottom of the cylinder, the lower ends of the slots being outwardly inclined as shown at 14. The cylinder is further provided with a plurality of outwardly extending vertical ribs 15, preferably arranged diametrically opposite one another, and which are provided with a vertical series of threads 16, extending throughout the length of the ribs. These ribs are cast on the outside of the cylinder; their upper ends are arranged flush with the top of the cylinder, and their lower ends terminate short of the bottom ends 14 of the slots 13, and thereby form an opening or outlet 17. As shown, four of the vertical externally threaded ribs are provided, but the precise number is not material. They are arranged to project beyond the circumference of the cylinder, as will be seen by reference to Fig. 3.

The invention further embodies a juice-expressing element comprising a ring 18, that is provided interiorly with a series of threads 19 which coöperate with and engage the threads 16 of the spaced ribs 15. Extending upwardly, and integral with the ring 18, is a U-shaped bail 19$^a$, the horizontal portion 19$^b$ thereof being arranged directly over the center of the ring. This horizontal portion or arm 19$^b$ is preferably of greater thickness than the two vertical arms or portions 19$^c$—19$^c$, and it is provided with an opening or bearing 20, which is located in the center of said member and directly above the cone 9. Depending from the horizontal arm and extending near to or below the bottom of the ring 18, is a plunger comprising a concaved body portion, forming a hollow conical-shaped head 22, which is located in the lower end thereof and is of substantially the same shape as the cone 9. The upper end 22$^a$ of the body portion is reduced in diameter and forms a shoulder 22$^b$ on which is located a plurality of washers 23. The upper end 22$^a$ is passed through the openeng 20, and provided at its extreme end with a series of threads 24, engaged by a nut 25, which secures the plunger to the bail of the expressing element, but allows it to revolve as on a swivel. Integral with and outwardly extending from the ring 18 are two handles 27—27, arranged diametrically opposite each other and in alinement with the bail.

It will be observed that the clamp is secured to a support, the bowl is arranged above the clamp and in alinement therewith, and also that the juice-expressing device is carried by and arranged above and in alinement with both the clamp and the bowl. Thus it will be seen that, when in operation, the pressure exerted is a direct pressure upon all the elements, as they are all in alinement with each other, and consequently there will be no lateral strain upon any part of the device.

The operation of the press is as follows:— The bowl is clamped to any support, preferably a table, by the thumb-screw 5, and the cylinder 11 is screwed onto the cone 9. A number of lemons are cut into halves, and these are placed, one upon another with their flat parts downwards, within the cylinder, the lower one resting upon the cone. The expressing element is then screwed to the outside of the cylinder, the hollow conical-shaped head of the plunger bearing upon the lemons. By continuous rotation through the handles 27—27 the ring will be forced downwardly, carrying with it the plunger, which does not revolve owing to its swivel connection with the bail 19. This movement is continued until sufficient pressure has been exerted upon the lemons to express all of the juice. It will be observed that when the juice is forced from the lemons, it passes out from the cylinder through the slots 13 into the bowl 1. The juice, which finds its way into the slots directly behind the ribs 15, will travel down said slots and pass out through the openings 17 into the bowl. As the bowl is slightly inclined with respect to the support, the juice will flow from said bowl through the outlet 2 into any suitable receptacle that is positioned on the table below the said spout.

The detachable connection between the cylinder and the cone, and between the cylinder and the expressing element, permits of the thorough cleaning of the parts, so as to free the apparatus of any accumulation of pulp or other parts of lemons. Moreover the screw pressure provided by this invention allows for a more thorough and quicker extraction of the juices of the fruit.

Having thus fully described my invention, what I claim as new and desire to secure by Letters Patent, is:—

1. In a juice expressing device, the combination with a clamp, of a bowl carried thereby and having its center in alinement with said clamp, a juice-expressing means mounted on the bowl and arranged in alinement with the clamp and bowl, legs depending from the clamp and diverging outwardly so as to straddle the vertical plane of the clamp, and means mounted on the clamp below the legs and in alinement with the juice expressing device and coöperating therewith to secure the said juice expressing device to a table or other support.

2. In a juice expressing device, the combination with a clamp comprising a yoke having spaced legs, the lower faces of which are inclined, said legs depending from the upper portion of the yoke, of a bowl carried by said clamp above the legs, said legs causing the bowl to assume an inclination, and said bowl having an outlet at its lower side, and clamping means mounted in the lower part of the yoke in alinement with the said legs and spaced therefrom.

3. In a juice expressing device, the combination with a clamp, of a bowl mounted thereon, a slotted cylinder mounted on the bowl, a cone at the bottom of the cylinder and within the same, and an expressing mechanism mounted on and moving over the cylinder and also within the same and coöperating with the cone.

4. In a juice expressing device, the combination with a clamp, of a bowl mounted thereon and carried thereby, a slotted cylinder detachably mounted on the bowl, a cone at the bottom of the cylinder and within the same and integral with the bowl, and a plunger mounted within the cylinder and coöperating with the cone.

5. In a juice expressing device, the combination with a clamp, of a bowl carried by the said clamp and having a centrally arranged cone, a cylinder detachably mounted on the cone and provided with a series of vertical slots, a plurality of spaced vertical ribs secured to the cylinder, and an expressing mechanism mounted on the cylinder and coöperating with said ribs for expressing the juice from the cylinder into the bowl.

6. In a juice expressing device, the combination with a clamp, of a bowl carried by said clamp, a slotted cylinder carried by the bowl and provided with a plurality of outwardly extending spaced vertical ribs having a series of threads thereon, and an expressing device coöperating with the threads of the ribs for expressing the juice through the slots of the cylinder into the bowl.

7. In a juice expressing device, the combination with a clamp, of a bowl carried by said clamp, a slotted cylinder carried by the bowl, and an expressing device adjustably mounted on the cylinder and provided with a plunger which operates within the cylinder for expressing the juice through the cylinder into the bowl.

8. An apparatus of the class described comprising a clamp, a bowl carried thereby and provided with a centrally arranged cone, a slotted cylinder secured to the cone, outstanding spaced ribs formed on the cylinder and provided with a series of threads, a ring provided with a series of internal threads mounted on the cylinder and adapted to coöperate with the threaded ribs, a bail carried by the ring and provided with a depending centrally arranged plunger which operates within the cylinder, and handles connected to said ring and adapted to rotate the same.

9. An apparatus of the class described comprising a clamp, a bowl carried thereby and provided with a centrally arranged cone, a slotted cylinder carried by the bowl and arranged around the cone, a ring movably mounted on the cylinder and provided with an upstanding bail, a plunger having a swivel bearing and depending from the bail and provided with a hollow conical-shaped head, said plunger being arranged within the cylinder, and means secured to the ring for forcing the plunger downwardly so that the hollow head of said plunger will coöperate with the cone to express the juice through the cylinder into the bowl.

10. An apparatus of the class described comprising a clamp, a bowl having a spout and a centrally arranged cone integral with said clamp, said cone having a series of threads arranged around the base, a cylinder having a series of spaced slots and threaded onto the cone, a plurality of diametrically opposite ribs located on the outside of the cylinder and provided with a series of threads, an expressing mechanism mounted on the ribs, and adapted to coöperate with said threads for expressing the juice through the cylinder and into the bowl.

11. In a juice expressing device, the combination with a clamp, of a bowl carried by said clamp, a slotted cylinder carried by the bowl and provided with a plurality of outwardly extending spaced vertical ribs having a series of threads thereon, and an expressing device coöperating with the threads of the ribs for expressing the juice through the slots of the cylinder into the bowl, said expressing device comprising a part moving over the outside of the cylinder and engaging the threads of the ribs, and a part moving within the cylinder, the two parts having a swivel connection at the top.

12. An apparatus of the class described comprising a clamp, a bowl carried thereby and provided with a centrally arranged cone, a cylinder mounted on the cone and provided with a series of vertical slots which terminate short of both the top and bottom ends of said cylinder, the lower ends of the slots being outwardly inclined, a plurality of spaced vertical ribs secured to the cylinder and arranged to partially cover one of the slots, said upper end of said ribs being arranged flush with the top of the cylinder and their lower ends terminating short of the bottom ends of the slots, and an expressing mechanism mounted on the cylinder and coöperating with said ribs for expressing the juice from the cylinder into the bowl.

In testimony, that I claim the foregoing as my own, I have hereto affixed my signature in the presence of two witnesses.

WILLIAM S. SCHWARTZ.

Witnesses:
J. J. MATHIS,
PETER COOK.